Nov. 28, 1961 J. R. ANDERSON 3,011,157

STORAGE DEVICES

Filed April 16, 1958 3 Sheets-Sheet 1

INVENTOR
JOHN R. ANDERSON

BY Louis A Kline
Albert L. Sessler, Jr.
HIS ATTORNEYS

INVENTOR
JOHN R. ANDERSON
BY Louis A. Kline
Albert L. Sessler, Jr.
HIS ATTORNEYS Nov. 28, 1961 J. R. ANDERSON 3,011,157

STORAGE DEVICES

Filed April 16, 1958 3 Sheets-Sheet 3

INVENTOR
JOHN R. ANDERSON

BY Louis A. Kline
Albert L. Sessler, Jr.
HIS ATTORNEYS

United States Patent Office 3,011,157
Patented Nov. 28, 1961

3,011,157
STORAGE DEVICES

John R. Anderson, Dayton, Ohio, assignor to The National Cash Register Company, Dayton, Ohio, a corporation of Maryland Filed Apr. 16, 1958, Ser. No. 729,023
18 Claims. (Cl. 340—173.2)

This invention relates to storage devices, and more particularly relates to storage devices utilizing components of the so-called "solid state" type.

Shifting, counting, memory, and other logical circuit devices are well known, and are of importance in such devices as computing and data processing systems. In the present invention such circuits are developed, using "solid state" elements, such as ferroelectric elements, electroluminescent elements, and photoconductive elements. The photoconductive elements, the resistance of which varies according to the amount of radiation of selected wave lengths applied thereto, serve as switching elements in the novel circuitry, and are optically coupled to the electroluminescent cells, which may be selectively excited to provide the proper radiation to change the photoconductive cells from a high resistance state to a low resistance state. The electroluminescent elements in turn are controlled by the ferroelectric elements, which may be selectively polarized to permit or to prevent an A.C. exciting voltage to be applied to the electroluminescent elements. The ferroelectric and electroluminescent elements are very compatible for inclusion in the same circuit, since both are capacitive devices, and the ferroelectric elements are capable of withstanding the high exciting voltages required by the electroluminescent elements.

The basic storage device of the invention, from which shift registers, counters, etc., may be built up, includes a pair of ferroelectric elements in series with an electroluminescent element. The polarization of the ferroelectric elements may be controlled by application of appropriate potentials to the circuit. The polarization of these elements with respect to each other determines their effective equivalent capacitance. This capacitance acts with the capacitance of the electroluminescent element to form a capacitive voltage-dividing network so that in one condition of polarization of the ferroelectric elements, with potential applied to the circuit, there will be a low potential drop across the electroluminescent element, thus preventing excitation thereof, while in the other condition of polarization of the ferroelectric element, there will be a large potential drop across the electroluminescent element, effective to excite the electroluminescent element to emit radiation, and thus transform an optically coupled photoconductive cell to the state of low resistance.

Storage devices utilizing a pair of ferroelectric elements are known, as shown, for example, in the United States Patent No. 2,695,396, issued November 23, 1954, to the present inventor. However, this patent did not contemplate the use of ferroelectric elements in combination with an electroluminescent element, which may readily be used for visual or other output purposes, and which is very well suited for optical coupling with photoconductive means for controlling further apparatus. This provides means whereby individual storage devices may be electrically isolated, yet operatively coupled to form such apparatus as shift registers, ring counters, etc.

Since ferroelectric materials have rectangular hysteresis characteristics, in which there are two remanent conditions of electrical charge (Q) or polarization, in which the cell exhibits substantial charge saturation, these elements are bi-stable and therefore well suited for storage for memory purposes. The individual storage devices previously described may, therefore, readily be combined to form shift registers, ring counters, etc., in which the state of the ferroelectric elements will be maintained until changed by appropriately applied electrical impulses.

It is accordingly an object of this invention to provide a simple and effective device for the storage of information.

Another object is to provide a storage device using solid state elements which are not subject to many of the undesirable characteristics of electron discharge devices.

A further object is to provide a storage device utilizing a combination of ferroelectric and electroluminescent elements.

An additional object is to provide a storage device having an optical output.

Still another object is to provide a storage device which combines ferroelectric and electroluminescent elements, the output being applied to one or more photoconductive elements to control the resistive state thereof.

Yet another object is to provide a shift register, utilizing ferroelectric, electroluminescent, and photoconductive elements, and in which the only coupling between stages, and between inputs and outputs to these stages, is by optical means.

Still a further object is to provide a counting device utilizing a combination of ferroelectric, electroluminescent, and photoconductive elements.

Still an additional object is to provide novel devices, using ferroelectric, electroluminescent, and photoconductive elements.

Still another object is to provide a shift register, capable of stepping either forward or backward.

With these and incidental objects in view, the invention includes certain novel features of construction and combinations of parts, a preferred form or embodiment of which is hereinafter described with reference to the drawings which accompany and form a part of this specification.

Figure 1:
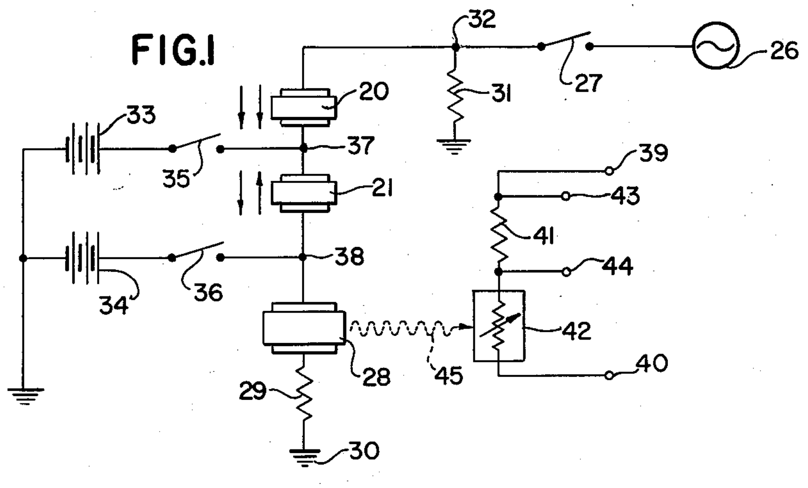
FIG. 1 is a diagram of an individual storage element constructed in accordance with this invention.

Referring now to FIG. 1 of the drawings, there is depicted one embodiment of an information storage device constructed according to the present invention. Included in this device are two ferroelectric elements 20 and 21, which are shown in the form of capacitors, with a ferroelectric material, such as barium titanate, forming the dielectric.

Barium titanate is one of a group of materials, commonly termed ferroelectrics, which have substantially recangular hysteresis loops. Hysteresis loops for barium titanate crystals of the type used in the present invention are illustrated in FIGS. 2 and 3, where the vertical axis represents electrical displacement or degree of polarization and the horizontal axis represents the voltage applied across the terminals of the ferroelectric elements, this voltage bearing a proportional relation to the electrical field strength.

Figure 2:
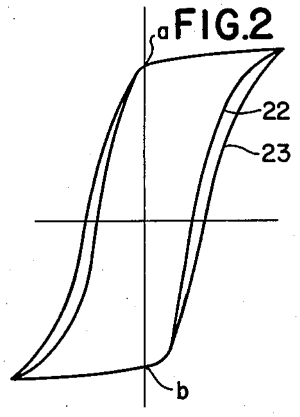
FIGS. 2 and 3 are graphs showing hysteresis loops for ferroelectric elements of the type shown in FIG. 1, illustrating different conditions of polarization of these elements.

The hysteresis loops for the individual ferroelectric elements 20 and 21 are shown in FIG. 2, where the loop 22 may be for the element 20, and the loop 23 for the element 21. Points *a* and *b* on the loops 22 and 23 are stable states of polarization, and the ferroelectric elements, when placed in either of these states by application of the required electrical field across the terminals thereof, will remain in such state for a considerable period without requiring application of energy from an external source for maintenance of the field.

Figure 3:
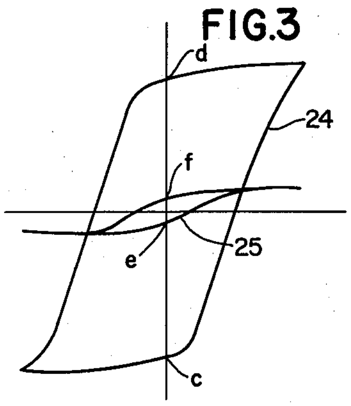

With regard to FIG. 3, the two loops shown there represent resultant hysteresis loops obtained from the combination of the two ferroelectric elements 20 and 21 under different conditions of polarization. When both ferroelectric elements 20 and 21 are polarized in the same direction, the loop 24 of FIG. 3, in which points *c* and *d* represent stable states of polarization, is obtained. Polarization of the elements 20 and 21 in opposite directions results in a loop such as that shown at 25 in FIG. 3, in which points *e* and *f* represent stable states of polarization.

Since the slopes of the hystersis loops of FIG. 3 are proportional to the effective resultant capacitance of the combination of the two ferroelectric elements 20 and 21, it is apparent that the change in polarization in going from the stable state *c* to the stable state *d* on the loop 24 is much greater than the change in polarization in going from the stable state *e* to the stable state *f* on the loop 25. Therefore it will be seen that the elements 20 and 21, when polarized in the same direction, as represented by the loop 24, will have a much larger effective capacitance than when they are polarized in opposite directions, as represented by the loop 25. This phenomenon is utilized to provide the simple but effective storage device shown in the diagram of FIG. 1.

The ferroelectric elements 20 and 21, as shown in FIG. 1, are included in a circuit path which also includes, in series arrangement, an A.C. source 26, a switch 27, an electroluminescent element 28, a resistor 29, and a return 30 to a base reference potential, shown as ground in FIG. 1. The electroluminescent element 28, like the ferroelectric elements 20 and 21, is depicted as a capacitor. In this case the dielectric used is zinc sulfide, copper halide activated, although any other material having suitable electroluminescent properties may be used. As is well known, electroluminescent materials have the characteristic of emitting radiation when excited by an electrical potential or field applied across them. Most electroluminescent materials display the property of electroluminescence best when excited by A.C., although electroluminescent materials responsive to D.C. also are known.

The circuit of FIG. 1 additionally includes a resistor 31, extending from a point 32 to ground. Also, two batteries, or other suitable D.C. sources, 33 and 34, are connected in paths which extend from ground over switches 35 and 36 to points 37 and 38, the point 37 being located between the ferroelectric elements 20 and 21, and the point 38 being located between the ferroelectric element 21 and the electroluminescent element 28. The battery 34 provides a voltage which is approximately twice that of the battery 33.

Also shown in FIG. 1 is an additional circuit path which extends between two terminals 39 and 40 and includes a resistor 41 connected in series with a photoconductive cell 42. As is well known, photoconductive materials possess the property of changing their electrical resistance in response to changes in radiation of certain wave lengths which impinges on them. One material frequently used for photoconductive cells of the type shown herein is cadmium sulfide, which has a high electrical resistance when not illuminated by radiation of suitable wave-lengths, and which has a relatively low electrical resistance when it is so illuminated. The terminals 39 and 40 may be connected to a suitable source of electrical power, and additional terminals 43 and 44 are provided, connected to opposite ends of the resistor 41, to facilitate measurement of the voltage drop across said resistor, said voltage drop being high when the photoconductive cell 42 is illuminated and in a low-resistance state, and being relatively lower when the photoconductive cell 42 is dark and in a relatively high-resistance state.

The dashed line 45 indicates an optical coupling path between the electroluminescent element 28 and the photoconductive cell 42. Illumination is thus provided for the cell 42 by excitation of the electroluminescent element 28.

The two ferroelectric elements 20 and 21 may be polarized in opposite or the same directions, as indicated by arrows in FIG. 1, by closing of the switches 35 or 36. As has been stated, these switches are in circuit paths for the sources 33 and 34, the voltage of source 33 being in excess of the saturation voltage of the elements 20 and 21, and the voltage of source 34 being approximately two times that of the source 33. The switches 35 and 36 may be of any suitable type having a high resistance when open and being capable of rapid operation. A photoconductive cell, such as the cell 42, is well suited for use as such a switch, as will appear subsequently in greater detail.

Binary information may be represented by the condition of polarization of the elements 20 and 21 with respect to each other. In the present description, it will be considered that a binary "one" is stored in the combination of elements 20 and 21 when these elements are polarized in the same direction, and that a binary "zero" is stored in these elements when they are polarized in opposite directions. Storage is effected by operation of the switches 35 and 36 in a manner which will now be described.

A binary "one" is stored by closing the switch 36 to apply a potential of at least twice the saturation voltage across the elements 20 and 21 from the source 34. Since the direction of application of potential is the same for both elements 20 and 21, both will be polarized in the same direction, and a binary "one" is thus stored in the storage device of FIG. 1.

A binary "zero" is stored by closing the switch 35, with the switch 36 being open. This applies a potential in excess of the saturation voltage for the elements 20 and 21 to the point 37 between these elements. From the point 37, the circuit is completed to ground in two different directions over two different paths, one including each ferroelectric element. This results in polarization of the elements 20 and 21 in different directions, thus storing a binary "zero."

In order to read out the storage device, the switch 27 is closed to provide voltage from the A.C. source 26 to the storage circuit. The switch 27, like the switches 35 and 36, may be of any suitable type having a high resistance when open and being capable of rapid operation, and may, if desired, be a photoconductive cell similar to the cell 42.

In the event that a binary "zero" has been stored in the ferroelectric elements 20 and 21, these elements in combination, according to the best understanding of the operation of the device of FIG. 1, present a low capacitance, as seen from the slope between *e* and *f* of the loop 25 of FIG. 3, and therefore a high capacitive reactance, according to the equation:

$$Xc=\frac{1}{2\pi fC}$$

where
$Xc$=capacitive reactance
$f$=frequency
$C$=capacitance

Since, as has been mentioned, the elements 20 and 21, in combination, act together with the electroluminescent element 28 to form a capacitive voltage dividing network, the high impedance (capacitive reactance) of the elements 20 and 21, resulting from their low resultant capacitance (about 10 micromicrofarads in the illustrated embodiment) when polarized in opposite directions, causes a large voltage drop across these elements, and a relatively small voltage drop across the electroluminescent element 28, which can be selected to have a capacitance, in the illustrated embodiment, of about 200 micromicrofarads. This small voltage drop is insufficient to excite the element 28 to cause it to emit radiation. Therefore, when the switch 27 is closed in the storage device of FIG. 1 for reading out of the storage device, and a "zero" is stored in said device, the electroluminescent element 28 is insufficiently excited or activated to cause emission of radiation therefrom.

On the other hand, when a "one" is stored in the ferroelectric elements 20 and 21 of the device of FIG. 1, these elements are polarized in the same direction, and present a relatively high capacitance, as shown by the slope between *c* and *d* of loop 24 in FIG. 3. This results in a relatively low capacitive reactance, according to the equation set out above, so that a relatively large amount of charge can be switched through the ferroelectric elements, and the voltage drop across them will be relatively low.

Therefore, when the switch 27 is closed to provide voltage from the A.C. source 26 to the storage device of FIG. 1, and a binary "one" has been stored in said device, the voltage dividing network comprising ferroelectric elements 20 and 21 and electroluminescent element 28 provides a low voltage drop across the elements 20 and 21, and a relatively high voltage drop across the element 28. This causes the element 28 to become excited or activated, with a consequent emission of radiation therefrom.

The output from the electroluminescent element 28 of the storage device of FIG. 1 may be used in one or more of a number of different ways. Since the output is in the form of radiation, it may be used to provide visual indication of the contents of the storage device, if desired. Also, the radiation may be used to produce a record of the contents of the storage device, as, for example, in cooperation with a strip of photographic film.

A further means for utilizing the output is shown in FIG. 1, where the photoconductive cell 42 is shown in optically coupled relation to the electroluminescent element 28. As has been mentioned previously, the cell 42 is connected in series with a resistor 41 between two terminals 39 and 40, to which an electrical source may be coupled. The terminals 43 and 44 connected to either end of the resistor 41 may be used for measurement of the potential drop across the resistor 41. The resistor 41 and the cell 42 will function as a voltage dividing device, due to the variable resistance properties of the photoconductive cell 42. When radiation is emitted from the electroluminescent element 28 over the optical coupling path 45 and impinges on the photoconductive cell 42, the resistance of this cell becomes relatively low, and there is consequently a large voltage drop across the terminals 43 and 44. On the other hand, when a "zero" is stored in the storage device of FIG. 1, and no radiation is emitted from the electroluminescent element 28 in response to a readout signal initiated by closing of the switch 27, the resistance of the cell 42 will be high, and the voltage drop across the resistor 41 will therefore be quite low. It is obvious that a suitable instrument may be connected to the terminals 43 and 44, and the magnitude of voltage indicated on such instrument will then serve to indicate the contents of the storage device of FIG. 1 during a read-out operation. Of course, the aforementioned output means are merely a few examples of the many which will readily suggest themselves to one skilled in the art.

It will also be seen that the photoconductive cell 42 which is in optically coupled relationship to the electroluminescent element 28 may be incorporated in a further storage or other logical device. For example, such a photoconductive cell may be used as one of the switches 27, 35, or 36, in a further storage device, as has been previously suggested.

Figures 4, 6:
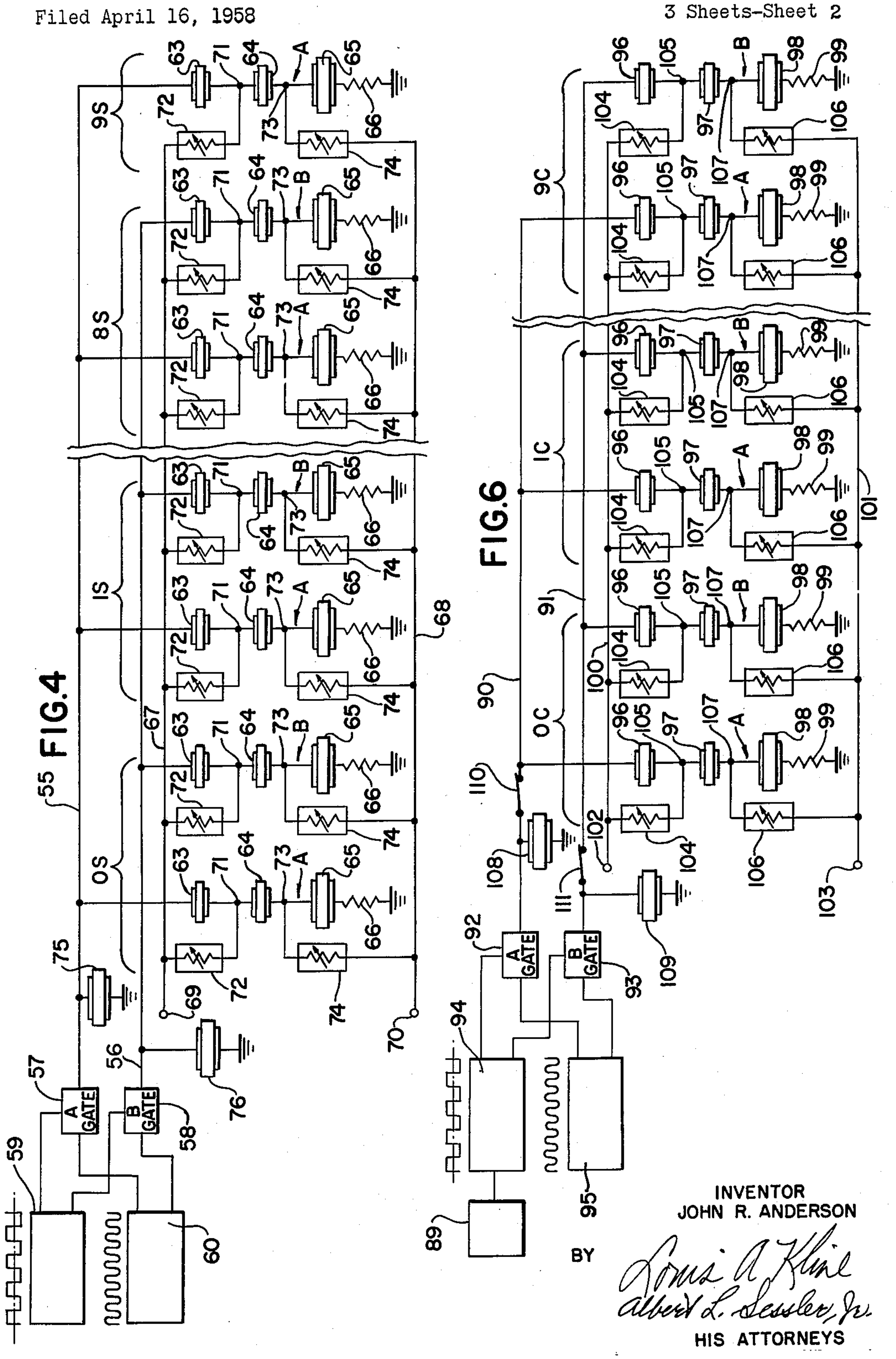
FIG. 4 is a diagram of a shift register circuit constructed in accordance with this invention.
FIG. 6 is a diagram of a ring counter circuit, according to the present invention.

A plurality of individual storage devices, similar to the device of FIG. 1, may be combined to form a shift register, as shown in FIG. 4, in which the interconnections between the various individual devices are in the form of optical couplings such as the optical coupling 45 of FIG. 1. It will be seen that the use of such an optical coupling means between components of a device such as a shift register has many inherent advantages, among which are freedom from sneak paths, the ability to use different circuit parameters in different portions of the device, low power requirements, decrease of wear and deterioration of components, etc.

Referring to FIG. 4, the shift register therein shown may be of any desired number of stages, such as ten stages, but only four stages, 0S, 1S, 8S, and 9S, are shown. The stages 2S through 7S, inclusive, which have been omitted from the drawing in order to prevent reptitious illustration and description, would be identical to the stage 8S. Each of the stages 0S through 8S includes two storage devices, designated A and B. The stage 9S contains only an A device, for reasons which will be disclosed subsequently. In the register, the A storage devices may be considered as storage and read-out devices, while the B devices normally serve only a transfer function. However, if desired, the B devices might also be used for storage and read-out.

All of the A storage devices are connected to a common input 55, and all of the B storage devices are similarly connected to a common input 56. The inputs 55 and 56 serve to transmit shift pulses to the A and B storage devices, respectively, from shift pulse gates 57 and 58. The shift pulses applied to the A input 55 also function as read-out pulses, as will be subsequently described. The gates 57 and 58 function to combine electrical signals from a square wave generator 59 and a sine wave oscillator 60 to produce shift pulses of the desired wave form. The gate 57 is designed to pass signals during the positive excursions of the square waves from the square wave generator 59 while the gate 58 is designed to pass signals during the negative excursions of the square waves produced by the square wave generator 59. The resultant wave forms produced by the gates 57 and 58 for transmission over the commons 55 and 56 to the A and B storage devices of the shift register, and their timing with respect to each other, are shown as wave forms 61 and 62 in FIG. 5. It will be seen that each shift pulse in the wave forms 61 and 62 actually comprises a plurality of cycles of the sine wave generated by the oscillator 60.

Each of the A and B devices of the stages 0S through 9S of the shift register is similar to the storage device shown in FIG. 1, and includes two ferroelectric elements 63 and 64, an electroluminescent element 65, and a resistor 66. The components 63, 64, 65, and 66 are connected between the common input 55 or 56, and a base reference potential or ground.

Means are provided for polarizing the ferroelectric elements 63 and 64 according to the information which it is desired to store in the register, and include two input commons 67 and 68 provided with terminals 69 and 70, respectively. A potential in excess of the saturation voltage of the ferroelectric elements 63 and 64 is provided at the terminal 69, and a voltage source equal in magnitude to at least twice the voltage at terminal 69 is applied to the terminal 70. A path is provided from the common 67 to a point 71 between the elements 63 and 64 on each of the storage devices in the register, and a photoconductive cell 72 is provided in each such path. Similarly, a path is provided from the common 68 to a point 73 between the elements 64 and 65 of each of the storage devices of the register, and a photoconductive cell 74 is provided in each such path.

An electroluminescent element 75 is connected to the A input common 55 and to ground, and is physically located in optically coupled relationship to the photoconductive cells 72 of each of the B storage devices of all stages 0S through 8S of the register. If it is desired, for convenience or other reasons, to provide more than one electroluminescent element 75 for coupling optically to the cells 72 of the B devices of stages 0S through 8S, this may obviously be accomplished by connecting such further elements to the common 55 in the same manner as element 75 is connected.

A further electroluminescent element 76 is connected to the B input common 56 and to ground, and is optically coupled to the photoconductive cells 72 for the A devices of stages 0S through 9S inclusive. As described above, more than one electroluminescent element 76 could be provided to facilitate optical coupling to each of the A cells 72 if this were deemed desirable.

The various components of the shift register of FIG. 4 are so arranged physically that the photoconductive cell 74 for each B device is optically coupled to the electroluminescent element 65 for the A device of the same stage, and the electroluminescent element 65 of each B device is optically coupled to the photoconductive cell 74 of the next succeeding A device.

Figure 5:
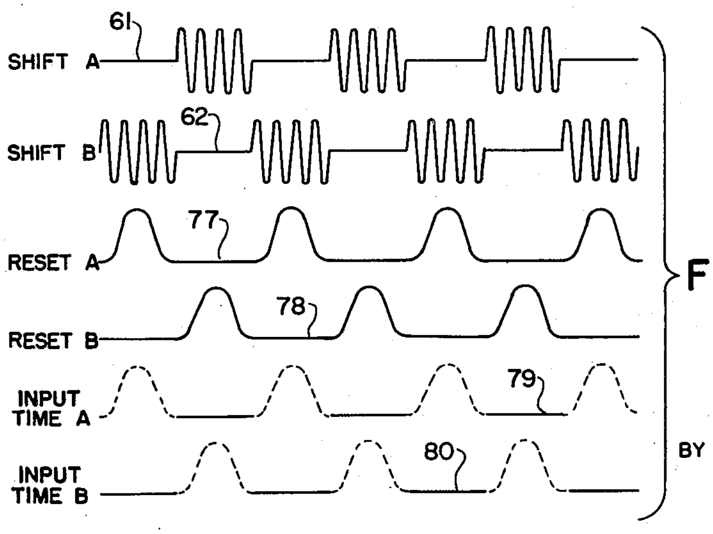
FIG. 5 shows wave forms at various points in the circuit of the shift register of FIG. 4, and shows the timing relationship betwen these various wave forms.

The operation of the shift register of FIG. 4 will now be described. Let it be assumed that the elements 63 and 64 in the storage devices for all of the stages 0S to 9S inclusive are polarized in opposite directions for storage of "zero." The square wave generator 59 and the sine wave oscillator 60 are normally continuously operating, so that a series of pulses having wave forms shown at 61 and 62 in FIG. 5 are produced by the gates 57 and 58 for the A and B input commons 55 and 56, respectively. These pulses on the commons 55 and 56, in addition to being supplied to the individual A and B storage devices of the various stages, as will subsequently be described, are also used to excite the electroluminescent elements 75 and 76. It will be recalled that these elements are optically coupled to the photoconductive cells 72 of the B and A storage devices, respectively, and that said cells serve as switches in paths extending from the D.C. common 67 to point 71 of each of the storage devices. This arrangement permits regularly timed pulses, hereafter known as reset pulses and having the wave forms shown at 77 and 78 in FIG. 5, to be applied to the A and B storage devices, respectively, at point 71. An examination of FIG. 5 reveals that the A reset pulses are timed in coincidence with the B shift pulses and that the B reset pulses are timed in coincidence with the A shift and read-out pulses. This, of course, results from the connection of the electroluminescent element 75, which is optically coupled to the cells 72 of the B devices, to the A common 55, and from the similar connection of the electroluminescent element 76 to the B common 56.

It will be seen that with all of the storage devices set to "zero," the regularly timed shift and reset pulses applied thereto will be ineffective to produce an output from any of the electroluminescent elements 65 of the various stages. This is true because the reset pulses applied to point 71 of the A and B devices will not alter the relative directions of polarization of the elements 63 and 64 in any of the storage devices, these elements being maintained in the state of opposite directions of polarization with respect to each other. Therefore, as has been described, the effective capacitance of the elements 63 and 64 considered together will be low, and the voltage drop across said elements, whenever, a shift pulse is applied to the storage devices, will be high. Consequently, there will be an insufficient voltage drop across any of the electroluminescent elements 65 to excite said elements to an appreciable degree. No optical output will be produced, and none of the photoconductive cells 74 will be illuminated.

Now let it be assumed that an optical input pulse is applied to the photoconductive cell 74 associated with the A storage device of the zero stage 0S of the shift register. The timing of this pulse with respect to the timing pattern of the other pulses applied to the shift register is shown in FIG. 5, where the wave form 79 represents pulses applied to point 73 of the A storage devices from the input common 68, while wave form 80 represents pulses applied to point 73 of the B storage devices from the input common 68 over the cell 74 associated with said B storage devices. It will be recalled that the input common 68 carries D.C. potential having twice the value of that carried on common 67. When an optical input pulse impinges on the photoconductive cell 74, the resistance of that cell is decreased, permitting higher potential to be applied to point 73 of the storage device. The pulses of wave forms 79 and 80 are shown in dashed, rather than solid, lines, since these pulses may be applied to the various storage devices of the shift register at selected times, rather than being regularly recurring pulses, as is the case with those shown by wave forms 61, 62, 77, and 78.

When a pulse is applied to point 73 by illumination of the associated photoconductive cell 74 of the A storage device of the zero stage 0S, the direction of polarization of the ferroelectric element 64 is reversed, so that the elements 63 and 64 are now polarized in the same direction, and a "one" is thereby stored in the A storage device of the zero stage. Now, when the next shift and read-out pulse group is applied to this storage device from the gate 57 over the common 55, the effective impedance of the elements 63 and 64, and the voltage drop thereacross, will be relatively low, thereby producing a high voltage drop across the electroluminescent element 65 which results in excitation of said element and the production of an optical output from the A storage device of the zero stage 0S.

The illumination produced by excitation of the electroluminescent element 65 of the A device impinges on the photoconductive cell 74 of the B device of the same stage, causing a pulse to be applied to the point 73 of said B device. The elements 63 and 64 of the B device are thereby caused to become polarized in the same direction, so that in effect the "one" stored in the A device of the zero stage has been transferred to the B device. Now, when the next pulse group is applied from the B gate over the common 56 to the B storage device of the zero stage, the electroluminescent element 65 of that stage will be exicited to provide an output, in the same manner as that described for the element 65 of the A device.

At the same time, as may be seen in FIG. 5, a reset pulse having wave form 77 is applied to point 71 on the A stage. The application of this pulse to point 71, in the absence of a pulse applied to point 73 by an optical input pulse on the photoconductive cell 74, will switch the direction of polarization of the ferroelectric elements 63 and 64 so that they are polarized in opposite directions with respect to each other, thereby restoring them to a "zero" state.

The output illumination from the electroluminescent element 65 of the B storage device of the zero stage impinges on the photoconductive cell 74 associated with the A storage device of the one stage 1S of the shift register, resulting in the application of a pulse to the corresponding point 73 to shift the direction of polarization of the ferroelectric elements 63 and 64 of the A device of the one stage 1S to the same direction, to store a "one" therein. The next pulse group applied to that device over the common 55 from the A gate 57 will result in an optical output from the electroluminescent element 65 of that device, and at the same time, the reset pulse applied to point 71 of the B storage device of the zero stage will cause that device to be reset to the "zero" state.

It may readily be seen that the pulse transfer process described above in connection with the first two stages of the shift register will continue and will shift the "one" which was originally stored in the A device of the zero stage by optical input on the photoconductive cell 74 of that device, completely through the shift register, a step at a time, until it reaches the final stage 9S of the register. It will be seen that this last stage has only an A storage device. No B storage device is required, since there is no shifting operation to a further stage but only a read-out. The read-out is taken from the optical output of the electroluminescent element 65 of the A storage device of stage 9S, and may be utilized in any desired manner, such as input to a further component of the system, a visual indication, etc. In the same manner, the optical output from the electroluminescent elements 65 of the A storage devices of any of the intermediate stages may also be used. Of course, the optical output from the electroluminescent element 65 of the B storage devices may be utilized if desired, the A storage devices having been selected herein to provide read-out means merely for illustrative purposes.

While the input to the shift register was shown as being applied only to the photoconductive cell 74 of the A storage device of the zero stage, it is obvious that a multi-denominational order number may be stored in the shift register by simultaneous application of inputs to several corresponding ones of the photoconductive cells 74 in desired stages. The register will then shift the number thus stored to successive stages, and read-out may subsequently be made either in parallel form simultaneously from the several stages after the desired number of shifts has been completed, or in serial form from the output of the electroluminescent element 65 of the final stage 9S of the shift register. A simple but efficient shift register has thus been provided in which both inputs and outputs may be in either serial or parallel form, and in which both take the form of optical pulses.

A ring counter, shown in FIG. 6, utilizes the same individual storage device, shown in FIG. 1, as was used in the shift register of FIG. 4, and is quite similar in construction to the shift register. Like the shift register of FIG. 4, the ring counter may be of any desired number of stages, only three of which, 0C, 1C, and 9C are shown.

Each stage of the counter of FIG. 6 includes two storage devices, designated A and B, including the last stage 9C. The last stage 9C includes both A and B storage devices, since it is coupled to the first stage 0C, as is customary in ring counters. All of the A storage devices are connected to a common input 90, and all of the B storage devices are similarly connected to a common input 91. The inputs 90 and 91 serve to transmit shift pulses to the A and B storage devices, respectively, from shift pulse gates 92 and 93. The gates 92 and 93 function to combine electrical signals from a square wave generator 94 and a sine wave oscillator 95 to produce shift pulses of the desired wave form. As is the case with the A and B shift pulses produced by the gates 57 and 58 in FIG. 4, the gate 92 is designed to pass signals during the positive excursions of the square waves produced by the square wave generator 94, while the gate 93 is designed to pass signals during negative excursions of the square waves produced by the square wave generator 94, and the resultant wave forms produced by the gates 92 and 93 resemble the wave forms 61 and 62 shown in FIG. 5. As will subsequently appear, the ring counter operates to shift a stored "one" from one stage to the next during each complete cycle of the square wave generated by the square wave generator 94, and thus may be considered to count "one" for each positive excursion of the square wave form generated by the generator 94, which may be controlled by an external control means 89 to produce square waves only in response to an input signal from some other component of the system in which the ring counter is utilized, for the purpose of counting these input signals. Alternatively, the counter may operate continuously, and be read out at specified times to determine its condition.

Each of the A and B devices of the stages 0C through 9C of the ring counter of FIG. 6 is similar to the storage device shown in FIG. 1 and includes two ferroelectric elements 96 and 97, an electroluminescent element 98, and a resistor 99. The components 96, 97, 98, and 99 are connected between the common inputs 90 or 91 and the base reference potential or ground. Polarizing means for the ferroelectric elements 96 and 97 are similar to those provided in FIG. 4 and include input commons 100 and 101 provided with terminals 102 and 103, respectively. A potential in excess of the saturation voltage of the ferroelectric elements 96 and 97 is provided at the terminal 102, and a voltage source equal in magnitude to at least twice the voltage at terminal 102 is applied to the terminal 103. A path including a photoconductive cell 104 is provided from the common 100 to a point 105 between the elements 96 and 97 on each storage device, and a similar path including a photoconductive cell 106 is provided from the common 101 to a point 107 between the elements 97 and 98 of each storage device. Electroluminescent elements 108 and 109 for applying reset pulses to the B and A storage devices, respectively, are coupled to the A and B common inputs 90 and 91, and are optically coupled to the photoconductive cells 104 of the A and B storage devices of each stage of the ring counter of FIG. 6.

The various components of the ring counter of FIG. 6 are so arranged physically that the photoconductive cell 106 of each B device is optically coupled to the electroluminescent element 98 for the A device of the same stage, and the electroluminescent element 98 of each B device is optically coupled to the photoconductive cell 106 of the next succeeding A device.

The operation of the ring counter shown in FIG. 6 is similar to the operation of the shift register of FIG. 4 in that a "one" which is stored in one of the storage devices of one stage of the counter will be shifted by successive A and B shift pulses through the A and B storage devices of succeeding stages of the counter, with reset pulses acting to restore the storage device from which the "one" has been shifted to a "zero" condition after said shifting has taken place. As has been stated, the counter of FIG. 6 differs from the register of FIG. 4 in having a B storage device associated with the ninth stage 9C of the counter. A "one" which has been stored in the A device of stage 9C of the counter will be shifted to the B device of that stage by the next succeeding shift pulse, instead of merely providing an output signal, as was the case with the register of FIG. 4. The electroluminescent element 98 of the B device of stage 9C of the counter is optically coupled to the photoconductive cell 106 of the A device of the zero stage 0C of the counter, so that on the following shift pulse, the "one" which is stored in the B device of stage 9C will be shifted back to the A device of the zero stage 0C of the counter. It will therefore be seen that the succeeding shift pulses step a "one" stored in th counting ring from position to position, so that the pulses may be counted by determining the position of the stored "one" in the ring. It is obvious that a transfer device may be provided to add one to a simliar ring of a higher denomination each time the counting ring is stepped from nine to zero. Since the coupling from stage 9C to stage 0C is an optical one, it would be extremely simple to arrange an additional photoconductive cell in optically-coupled relation to the electroluminescent element 98 of the B device of stage 9C, so that this photoconductive cell would cause a pulse to be transmitted to a next higher order ring or some other device during each complete cycle of the counting ring.

Customarily, the ring will be set with a "one" stored in the storage device A of the zero stage 0C, and with a "zero" stored in all other storage devices of the ring. The "one" which is stored in the zero stage will then be stepped through the ring by the shift pulses applied to commons 90 and 91 in the manner described above.

Any one of several methods might be used to clear the ring counter of FIG. 6 to zero. Regular reset pulses may be applied in succeeding pulse times to the photoconductive cells 104 of all of the storage devices by the electroluminescent elements 108 and 109 in the regular manner, but with two normally closed switches 110 and 111 in the commons 90 and 91 opened to cut off the shift pulses from the storage devices A and B of all stages of the counting ring. Another means for accomplishing this would be to temporarily interrupt the supply of potential to the terminal 103 during the shifting operation, which would prevent the stored "one" from being shifted to the next storage device. Additional means will suggest themselves to one skilled in the art.

After the counting ring of FIG. 6 has been cleared so that all of its storage devices are set to zero, an optical input pulse to the photoconductive cell 106 of the A storage device of the zero stage 0C will cause a "one" to be stored in that device, to condition the ring for another counting operation.

It will be seen that a counting ring has been provided which is simple and effective in construction and operation and in which the optical output from the electroluminescent elements 98 of the storage devices A and B of the various stages may be used to indicate the position to which the ring has been stepped at any time.

Figure 7:
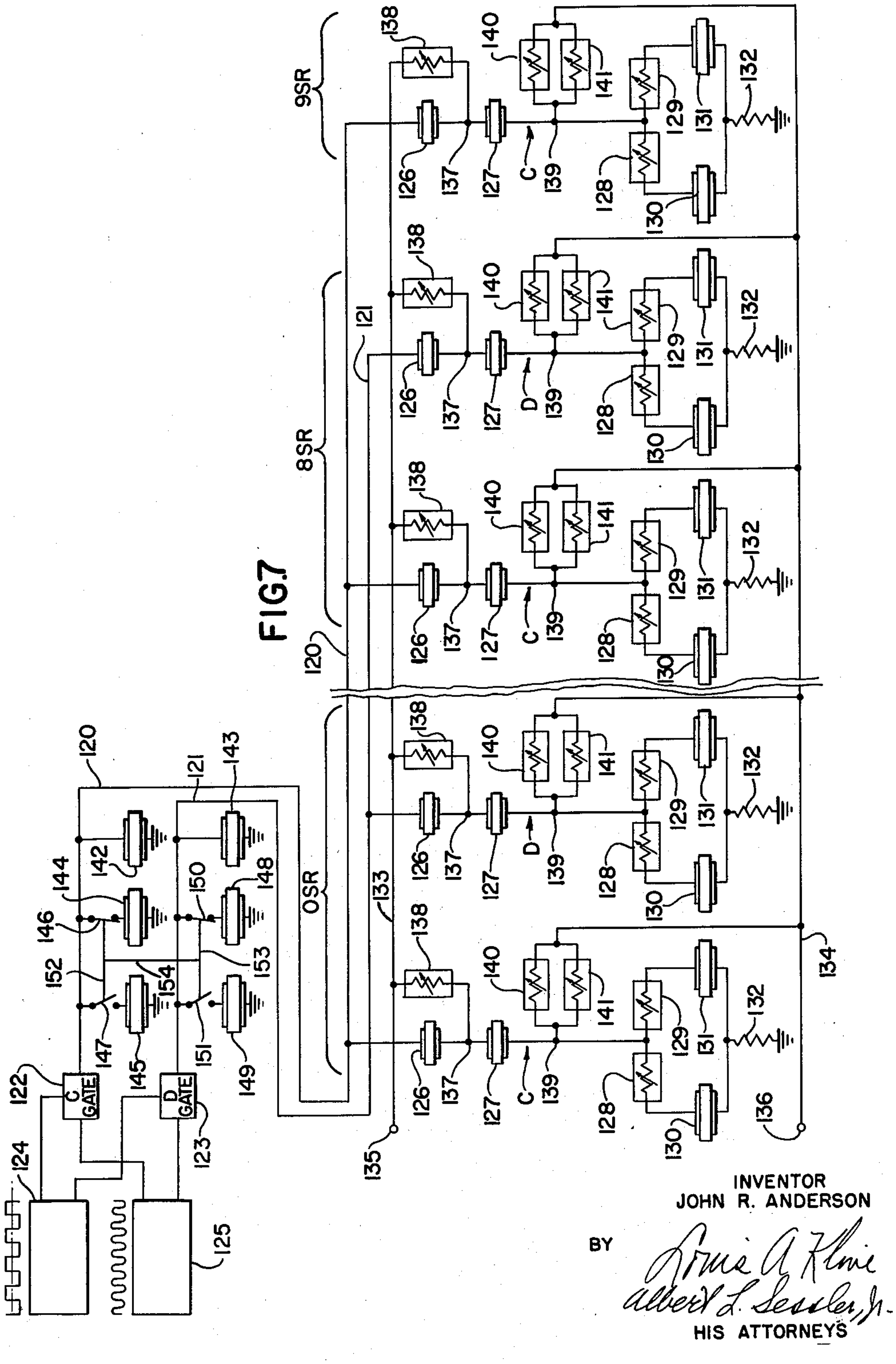
FIG. 7 is a diagram of a shift register constructed in accordance with the present invention and capable of stepping either forward or backward.

FIG. 7 shows a shift register similar in some respects to that of FIG. 4, but which is capable of shifting in either direction. This capability is attained by the use of additional optically coupled pairs of electroluminescent elements and photoconductive cells. Like the shift register of FIG. 4, and the counter of FIG. 6, the register of FIG. 7 may be of any desired number of stages, though only three stages, 0SR, 8SR, and 9SR, are shown. The stages 1SR through 7SR inclusive, which have been omitted from the drawing in order to prevent repetitious illustration and description, would be identical to the stage 8SR. Each of the stages 0SR through 8SR includes two storage devices designated C and D. The stage 9SR contains only a C device for reasons which are to be subsequently disclosed. In the shift register of FIG. 7, the C storage devices may be considered storage and read-out devices, while the D devices normally serve only a transfer function but could, if desired, also be used for storage and read-out.

All of the C storage devices are connected to a common input 120, and all of the D storage devices are similarly connected to a common input 121. The inputs 120 and 121 serve to transmit shift pulses to the C and D storage devices, respectively, from shift pulse gates 122 and 123. The shift pulses applied to the C input 120 also normally function as read-out pulses, as will subsequently be described. The gates 122 and 123 function to combine electrical signals from a square wave generator 124 and a sine wave oscillator 125 to produce shift pulses of the desired wave form. The gate 122 is designed to pass signals during the positive excursions of the square waves produced by the square wave generator 125, while the gate 123 is designed to pass signals during the negative excursions of the square waves produced by the square wave generator 124. The resultant wave forms produced by the gates 122 and 123 over the commons 120 and 121 to the C and D storage devices of the shift register, and their timing with respect to each other, are similar to the wave forms 61 and 62 shown in FIG. 5.

Each of the storage devices C and D of the stages 0SR to 9SR inclusive is of similar construction and extends between the common input 120 or 121 and a base reference potential or ground. Two ferroelectric elements 126 and 127 are connected in series to a parallel network of two branches, the left-hand branch having a photoconductive cell 128 in series with an electroluminescent element 130, and the right-hand branch having a photoconductive cell 129 in series with an electroluminescent element 131. A resistor 132 connects the parallel network to ground.

Means are provided for polarizing the ferroelectric elements 126 and 127 according to the information which it is desired to store in the register, and include two input commons 133 and 134 provided with terminals 135 and 136, respectively. A potential in excess of the saturation voltage of the ferroelectric elements 126 and 127 is provided at the terminal 135, and a voltage source equal in magnitude to at least twice the voltage at terminal 135 is applied to the terminal 136. A path is provided from the common 133 to a point 137 between the elements 126 and 127 on each of the storage devices in the register, and a photoconductive cell 138 is provided in each such path. Similarly, a path is provided from the common 134 to a point 139 between the element 127 and the parallel network, and a parallel combination of photoconductive cells 140 and 141 is provided in each such path. An electroluminescent element 142 is connected to the C input common 120 and to ground, and is physically located in optically-coupled relationship to the photoconductive cells 138 of each of the D storage devices of all stages 0SR to 8SR, inclusive, of the register. More than one electroluminescent element 142 may be provided for optically coupling to the cells 138 of the D devices of stages 0SR through 8SR, if desired. In a similar manner, an electroluminescent element 143 is connected to the D input common 121 and to ground, and is optically coupled to the photoconductive cells 138 for the C devices of stages 0SR through 9SR, inclusive.

The electroluminescent elements 130 and 131 for each of the C and D devices for each stage of the shift register are so arranged with respect to the photoconductive cells 140 and 141 that the electroluminescent element 130 for each storage device is optically coupled to the photoconductive cell 140 of the preceding, or adjacent to the left, storage device, while each electroluminescent element 131 is optically coupled to the photoconductive cell 141 of the next higher, or adjacent to the right, storage device. This arrangement provides that when the electroluminescent elements 131 are permitted by their corresponding photoconductive cells 129 to be excited by shift pulses under proper conditions, the shift register will shift forward, or to the right as shown in FIG. 7, while, when the photoconductive cells 129 are switched off and the cells 128 are shifted to permit the electroluminescent elements 130 to be excited under proper conditions by their shift pulses, the shift register will shift backward or to the left.

Two additional electroluminescent elements 144 and 145 are coupled to the common 120 over switches 146 and 147, and similarly, two additional electroluminescent elements 148 and 149 are coupled to the input common 121 over switches 150 and 151. The switches 146 and 147 are coupled together, as by a connector 152, in such a manner that when one of the switches is open, the other is closed. The switches 150 and 151 are similarly coupled together, as by a connector 153. The connectors 152 and 153, in turn, are interconnected by a member 154, which may be manually operable, so that when the switches 147 and 151 are open, the switches 146 and 150 will be closed, and vice versa. The switches controlled by the connectors 152 and 153 are used to determine the direction of stepping of the shift register of FIG. 7. The electroluminescent elements 144 and 148 are coupled optically to the photoconductive cells 129 of the C and D storage devices, respectively, of the various stages of the shift register, while the electroluminescent elements 145 and 149 are coupled optically to the photoconductive cells 128 of the C and D storage devices of the various stages of the shift register. Thus, it will be seen that when the switches 146 and 150 are closed, the electroluminescent elements 144 and 148 will be excited by each pulse applied to their respective inputs 120 and 121 and will illuminate the photoconductive cells 129 of the C and D storage devices of the register to cause said devices to change from a high to a low resistance state. At this time, the switches 147 and 151 will be open, so that the electroluminescent elements 145 and 149 will not be excited by pulses applied to the commons 120 and 121 and the photoconductive cells 128 of the C and D devices of the various stages of the register will therefore remain dark and in a high resistance state. When the switches 146 and 150 are opened and the switches 147 and 151 are closed, then the conditions described above will be reversed, and the photoconductive cells 128 of the C and D devices of the various stages of the register will be in an illuminated low resistance state, while the photoconductive cells 129 of the same corresponding devices will be dark and in a high resistance state.

The operation of the shift register of FIG. 7 is similar to the operation of the register of FIG. 4, with the exception as noted that the register of FIG. 7 can be caused to step either forward or backward. This directional control is achieved by use of the electroluminescent elements 144, 145, 148, and 149, in combination with the photoconductive cells 128 and 129, described above, in a manner which will subsequently be disclosed.

Let it be assumed that the elements 126 and 127 in the storage devices C and D for all of the stages 0SR to 9SR, inclusive, are polarized in opposite directions for storage of zero. The square wave generator 124 and the sine wave oscillator 125 are normally continuously operating, so that a series of pulse groups having wave forms similar to the wave forms shown at 61 and 62 in FIG. 5 are produced by the gates 122 and 123 for the C and D input commons 120 and 121, respectively. These groups of pulses on the commons 120 and 121, in addition to being supplied to the individual C and D storage devices of the various stages, as will be subsequently described, are also used to excite the electroluminescent elements 142 and 143, and also either the pair of electroluminescent elements 144 and 148, or the pair of electroluminescent elements 145 and 149.

Since the elements 142 and 143 are optically coupled to the photoconductive cells 138 of the D and C storage devices, respectively, and since these cells serve as switches in paths extending from the D.C. common 133 to point 137 of the storage devices, regularly timed reset pulses, having wave forms similar to those shown at 77 and 78 in FIG. 5, are applied to the C and D storage devices, respectively, at point 137. The C reset pulses are timed in coincidence with the C shift and read-out pulses.

As is true with the register of FIG. 4, when all of the storage devices are set to "zero," the regularly timed shift and reset pulses applied thereto will be ineffective to produce an output from any of the electroluminescent elements 130 or 131 of the various stages. This is because the effective capacitance of the elements 126 and 127 considered together will be low, and the voltage drop across said elements, whenever shift pulse is applied to the storage devices, will be high. As a result, there is an insufficient voltage drop across any of the electroluminescent elements 130 or 131 to excite said elements to an appreciable degree, and no optical output will therefore be produced to illuminate any of the photoconductive cells 140 or 141.

Now, let it be assumed that it is desired to enter a "one" into the zero stage 0SR of the shift register of FIG. 7, and to shift this "one" to successively higher stages of the register, or to the right as viewed in FIG. 7. To condition the register for stepping to the right, the switches 146 and 150 must be closed, while the switches 147 and 151 must be open. This is accomplished by operation of the switching arrangement described in connection with the switches. With the switches 146 and 150 closed, it will be seen that, whenever a C shift pulse is applied to the common 120, the electroluminescent element 144 will be excited, thereby illuminating the photoconductive cell 129 of each of the C storage devices of the register and causing said cells to assume a low resistance state, while the application of a shift pulse to the D common 121 will similarly cause the photoconductive cells 129 for the D storage devices to assume a low resistance state. On the other hand, the photoconductive cells 128 of all of the storage devices of the register will maintain a high resistance state, since these cells will not be illuminated at any time during this operation, and will thereby effectively prohibit excitation of the electroluminescent elements 130 of any of the storage devices of the register of FIG. 7.

In order to store a "one" in the C storage device of the zero stage 0SR of the register, an optical input pulse is applied to the photoconductive cell 141 of this storage device. The timing of this pulse with respect to the timing pattern of the other pulses applied to the shift register is similar to that shown in FIG. 5, where the wave form 79 shows the timing of pulses applied to point 139 of the C storage device from the input common 134, while the wave form 80 shows the timing of pulses applied to point 139 of the D storage devices from the input common 134. Application of an optical input pulse to the photoconductive cell 141 causes the resistance of that cell to decrease momentarily, permitting a potential approximately equal to that applied to the terminal 136, and having a value of twice the potential applied to the terminal 135, to be applied to the point 139 of the storage device. When such a pulse is applied to the point 139, the polarization of the ferroelectric element 127 is reversed, so that the elements 126 and 127 are now polarized in the same direction and a "one" is stored thereby in the C storage device of the zero stage 0SR. Now, when the next shift and read-out pulse group is applied to this storage device from the C gate 122, over the common 120, the effective impedance of the elements 126 and 127, in combination, and the voltage drop thereacross will be relatively low. Also, the resistance of the photoconductive cell 129 is relatively low, while the resistance of the photoconductive cell 128 is relatively high. With these conditions present, a high voltage drop will be produced across the electroluminescent element 131 which will result in excitation of said element and production of an optical output from the zero stage 0SR.

Since the photoconductive cell 141 of the D storage device of the zero stage 0SR of the register is optically coupled to the electroluminescent element 131, of the C storage device of the zero stage 0SR, the illumination produced by excitation of said element causes the resistance of the cell 141 to be decreased, and thereby results in application of a pulse to point 139 of the D storage device of the zero stage 0SR. The elements 126 and 127 of the D device are thereby caused to become polarized in the same direction, so that the "one" stored in the C device of the zero stage has been transferred to the D device. Now, when the next pulse group is applied from the D gate 123 over the common 121 to the D storage device of the zero stage 0SR, the electroluminescent element 131 of that stage will be excited to provide an output, in the same manner as that described for the element 131 of the C device. At the same time, a reset pulse is applied, as a result of excitation of the electroluminescent element 143, to point 137 on the C device, which will switch the direction of polarization of the ferroelectric elements 126 and 127 of said device so that they are polarized in opposite directions with respect to each other, thereby restoring them to a "zero" state.

The output illumination from the electroluminescent element 131 of the D storage device of the zero stage 0SR then impinges on the photoconductive cell 141 (not shown) and associated with the C storage device of the one stage 1SR of the shift register, resulting in the application of a pulse to the corresponding point 139 on said device to cause the ferroelectric elements 126 and 127 of the C storage device of the one stage 1SR to become polarized in the same direction, to store a "one" therein. The next pulse group applied to that device over the common 120 from the C gate 122 will result in an optical output from the electroluminescent element 131 of that device, and, at the same time, the reset pulse applied to point 137 of the D storage device of the zero stage 0SR will cause that device to be reset to the "zero" state.

It may readily be seen that the pulse transfer process described above in connection with the first two stages of the shift register of FIG. 7 will continue and will shift the "one" which was originally stored in the C storage device of the zero stage 0SR by optical input on the photoconductive cell 141 of that device, completely through the shift register, a step at a time, until it reaches the final stage 9SR of the register. As is the case in the register of FIG. 4, the last stage has only one C storage device, since read-out only, and no shifting, is required from this stage. The read-out is taken from the optical output of the electroluminescent element 131 of the C storage device of stage 9SR, and may be utilized in any desired manner.

In the event that it is desired to step the shift register to the left, rather than to the right, as viewed in FIG. 7, the setting of the switches 146, 147, 150, and 151 must be changed so that the switches 146 and 150 are open, and the switches 147 and 151 are closed. Information stored in any of the stages of the shift register may now be shifted to the left rather than to the right. The operation of the register, when shifting to the left, is similar to that described above in connection with the shifting to the right, with the exception that the photoconductive cells 129 will be dark during this operation, while the cells 128 will be illuminated and changed to a low resistance state by the pulses applied by the gates 122 and 123 to the input commons 120 and 121 and thence to the electroluminescent elements 145 and 149. The electroluminescent elements 130, rather than the elements 131, will serve to provide the optical outputs from the various storage devices, and will illuminate the photoconductive cells 140, to which they are optically coupled, of the storage devices adjacent to the left, for effecting storage of information in said storage devices. The operation of the shift register of FIG. 7 for shifting to the left is otherwise similar to that described above for shifting to the right.

The optical output from the electroluminescent elements 130 or 131, depending upon the direction of shifting, of the storage devices of the shift register of FIG. 7, may be utilized in any desired manner, such as indication, recording, or control of further components of the system. Similarly, inputs may be applied to any of the storage devices of the register by application of optical pulses to the photoconductive cells 140 or 141 of the various stages. With this register, it is therefore possible to store a multi-denominational order number, either serially or simultaneously, to shift it in either direction, and subsequently to read it out either in parallel or serial form.

A number of novel applications of the storage device of FIG. 1, or modifications thereof, have been set forth above, but it is obvious that many other possible circuit components which could make use of the device of FIG. 1 exist, and will readily suggest themselves to one skilled in the art.

An illustrative embodiment of the storage device of FIG. 1 includes ferroelectric elements 20 and 21 which are barium titanate crystals. The electroluminescent element 28 is in the form of a panel having copper halide-activated zinc sulfide, sandwiched between two conductive plates and affixed to a rigid base. A crystal of cadmium sulfide is used as the photoconductive cell 42. The resistors 29 and 31 are 100,000 ohms and 1,000 ohms, respectively; the battery 33 is 22.5 volts; the battery 34 is 45 volts; the A.C. source 26 provides a potential of 400 volts peak-to-peak at a frequency of 1 to 5 kilocycles; and the means for measuring the resistance of the photoconductive cell 42, shown in FIG. 1 as resistor 41 and terminals 43 and 44, takes the form of a commercially available ohmmeter. These same circuit parameters could be used in the shift registers and the ring counter shown and described herein. It should be realized that the above circuit values are merely illustrative and are not to be construed as limiting the invention in any way, since other circuit values could readily be employed, if desired.

The circuit devices of FIGS. 1, 4, 6, and 7 lend themselves very well to simple fabrication techniques, readily adaptable for quantity production. The devices described herein may be fabricated, for example, by depositing the various elements in layers, one above the other, to form a laminated, sandwich-type package. Such a package, having no moving parts, would be extremely compact and durable.

While the forms of the invention illustrated and described herein are particularly adapted to fulfill the objects aforesaid, it is to be understood that other and further modifications may be made without departing from the spirit of the invention.

What is claimed is:

1. A sequentially operable device comprising, in combination, a first plurality of pairs of ferroelectric elements; a second plurality of pairs of ferroelectric elements; an electroluminescent output element associated with each pair of ferroelectric elements; means for polarizing the ferroelectric elements of each pair in opposite directions with respect to each other; control means including a photoconductive element for reversing the polarization of one element of each pair so that the two elements of the pair are then polarized in the same direction; first shift means capable of applying shift pulses to said first plurality of pairs of ferroelectric elements; and second shift means capable of applying shift pulses to said second plurality of pairs of ferroelectric elements, said first and second shift pulses producing an output signal from the electroluminescent output elements when their associated pairs of ferroelectric elements are polarized in the same direction, the electroluminescent output elements associated with the first plurality of pairs of ferroelectric elements being optically coupled to the photoconductive elements of the control means for the adjacent pairs of ferroelectric elements of the second plurality to control the operation of said control means, and the electroluminescent output elements associated with the second plurality of pairs of ferroelectric elements being optically coupled to the photoconductive elements of the control means for the adjacent pairs of ferroelectric elements of the first plurality to control the operation of said control means, so that an output signal from an electroluminescent element associated with one of the pairs of ferroelectric elements of the first plurality is effective to cause the polarization in the same direction of the adjacent pair of ferroelectric elements, of the second plurality, and also so that an output from the electroluminescent element associated with one of the pairs of ferroelectric elements of the second plurality is effective to cause the polarization in the same direction of the adjacent pair of ferroelectric elements of the first plurality.

2. A sequentially operable device comprising, in combination, a first and a second pair of serially connected ferroelectric elements; first and second electroluminescent output means serially connected to said first and second pair of ferroelectric elements, respectively; means connected to the junction of the ferroelectric elements in each pair for polarizing the ferroelectric elements of each pair in opposite directions; means serially connected to said first pair of ferroelectric elements and operable to change the polarization of one of the ferroelectric elements of the first pair, so that both elements of said first pair are polarized in the same direction; control means including a photoconductive element serially connected to the second pair of ferroelectric elements and optically coupled to the first electroluminescent output means for changing the direction of polarization of one of the ferroelectric elements of the second pair, so that both elements of said second pair are polarized in the same direction; and shifting means capable of causing an emission of radiant energy from the first electroluminescent output means when the ferroelectric elements of said first pair are polarized in the same direction, this emission of radiant energy being effective to influence the photoconductive element to cause operation of the control means for the second pair of ferroelectric elements to change the direction of polarization of one of the elements of said second pair, so that both of the elements of said second pair are polarized in the same direction.

3. A sequentially operable device comprising, in combination, a first and a second pair of ferroelectric elements; first and second electroluminescent output means operatively coupled to said first and second pair of ferroelectric elements, respectively; means for polarizing the ferroelectric elements of each pair in opposite directions; means operable to change the polarization of one of the ferroelectric elements of the first pair, so that both elements of said first pair are polarized in the same direction; control means including a photoconductive element associated with the second pair of ferroelectric elements and optically coupled to the first electroluminescent output means for changing the direction of polarization of one of the ferroelectric elements of the second pair, so that both elements of said second pair are polarized in the same direction; and shifting means capable of causing an emission of radiant energy from the first electroluminescent output means when the ferroelectric elements of said first pair are polarized in the same direction, this emission of radiant energy being effective to influence the photoconductive element to cause operation of the control means for the second pair of ferroelectric elements to change the direction of polarization of one of the elements of said second pair, so that both of the elements of said second pair are polarized in the same direction.

4. A sequentially operable device comprising, in combination, a first and a second pair of ferroelectric elements; first and second output means operatively coupled to said first and second pair of ferroelectric elements, respectively; means for polarizing the ferroelectric elements of each pair in opposite directions; means operable to change the polarization of one of the ferroelectric elements of the first pair, so that both elements of said first pair are polarized in the same direction; control means associated with the second pair of ferroelectric elements and optically coupled to the first output means for changing the direction of polarization of one of the ferroelectric elements of the second pair, so that both elements of said second pair are polarized in the same direction; and shifting means capable of causing an output signal from the first output means when the ferroelectric elements of said first pair are polarized in the same direction, this output signal being effective to operate the control means for the second pair of ferroelectric elements to change the direction of polarization of one of the elements of said second pair, so that both of the elements of said second pair are polarized in the same direction.

5. A sequentially operable device comprising, in combination, a first and a second pair of bi-stable elements; first and second electroluminescent output means operatively coupled to said first and second pair of bi-stable elements, respectively; means for setting the bi-stable elements of each pair to dissimilar states; means operable to change the state of one of the bi-stable elements of the first pair, so that both bi-stable elements of said first pair are in the same state; control means including a photoconductive element associated with the second pair of bi-stable elements and optically coupled to the first electroluminescent output means for changing the state of one of the bi-stable elements of the second pair, so that both elements of said second pair are in the same state; and shifting means capable of causing an emission of radiant energy from the first electroluminescent output means when the bi-stable elements of said first pair are in the same state, this emission of radiant energy being effective to influence the photoconductive element to cause operation of the control means for the second pair of bi-stable elements to change the state of one of the elements of said second pair, so that both of the elements of said second pair are in the same state.

6. A sequentiallyoperable device comprising, in combination, a first and a second pair of bi-stable elements; first and second output means operatively coupled to said first and second pair of bi-stable elements, respectively; means for setting the bi-stable elements of each pair of dissimilar states; means operable to change the state of one of the bi-stable elements of the first pair, so that both elements of said first pair are in the same state; control means associated with the second pair of bi-stable elements and optically coupled to the first output means for changing the state of one of the bi-stable elements of the second pair, so that both elements of said second pair are in the same state; and shifting means capable of causing an output signal from the first output means when the bi-stable elements of said first pair are in the same state, this output signal being effective to operate the control means for the second pair of bi-stable elements to change the state of one of the elements of said second pair, so that both of the elements of said second pair are in the same state.

7. A sequentially operable device comprising, in combination, a plurality of pairs of ferroelectric elements, each pair being capable of assuming either of two stable states, the first state representing a first condition and the second state representing a second condition; an output element associated with each pair; control means for changing the state of the pairs of ferroelectric elements from said first state to said second state; optical coupling means for optically coupling each output element to the control means for an adjacent pair of ferroelectric elements; shifting means for applying shifting pulses to the pairs of ferroelectric elements and the associated output elements, each output element providing an output signal in response to said pulses when its associated pair of ferroelectric elements is in said second state, the output signal acting through the optical coupling means to operate the control means for the next pair of ferroelectric elements to change said pair to said second state and thus shift information thereto; and reset means to reset to said first state the pairs of ferroelectric elements from which information has been shifted.

8. A shifting device comprising, in combination, a first pair of ferroelectric elements; a second pair of ferroelectric elements; control means including a photosensitive cell associated with each pair of elements for controlling the polarization of said elements; electroluminescent means associated with each pair of elements for indicating the condition of polarization of said elements with respect to each other; and shifting means capable of exciting the electroluminescent means to emit radiant energy under one condition of polarization of the associated pair of ferroelectric elements, the electroluminescent means associated with the first pair of elements being capable of influencing the photosensitive cell to cause operation of the control means for the second pair of elements to establish the polarization of the second pair of elements in accordance with the polarization of the first pair of elements upon operation of the shifting means.

9. A shifting device comprising, in combination, a first pair of bi-stable elements; a second pair of bi-stable elements; means associated with each pair of elements for controlling the state of said elements; output means associated with each pair of elements for indicating the state of said elements with respect to each other; and shifting means capable of causing an output signal to be produced by the output means when the states of the associated pair of bi-stable elements are in a predetermined relationship with respect to each other, the output means associated with the first pair of elements being optically coupled to the control means for the second pair of elements to control the state of the second pair of elements in accordance with the state of the first pair of elements upon operation of the shifting means.

10. A sequentially operable apparatus comprising, in combination, a plurality of ferroelectric memory means; electroluminescent means associated with each ferroelectric means; photoconductive means optically coupled to each electroluminescent means and capable of controlling the condition of the next succeeding ferroelectric memory means; and means capable of exciting the electroluminescent means when the associated ferroelectric memory is in a given condition, whereby information may be transmitted from one ferroelectric means to the next.

11. A sequentially operable apparatus comprising, in combination, a plurality of storage devices, each comprising bi-stable ferroelectric means and electroluminescent output means; optically controlled means for coupling the storage devices; and means for shifting information stored in one of said devices to succeeding devices.

12. A shifting device comprising, in combination, first and second pairs of ferroelectric elements; means associated with said first pair for storing information therein; and means including optical coupling means for transferring stored information from said first pair to said second pair.

13. A counting device comprising, in combination, a plurality of pairs of ferroelectric elements; means associated with each pair to cause the elements of each pair to assume one of two states with respect to each other; optically coupled transfer means connecting each adjacent pair of ferroelectric means, and including transfer means connecting the pairs of ferroelectric elements representing the highest and lowest orders of the device.

14. A shifting device comprising, in combination, first and second pairs of ferroelectric elements; means associated with said pairs for storing information therein; and means including optical coupling means for selectively transferring stored information either from said first pair to said second pair, or from said second pair to said first pair.

15. A sequential counting device comprising, in combination, a plurality of pairs of ferroelectric elements, each pair being capable of assuming either of two stable states, the first state representing a first condition and the second state representing another condition; an output element associated with each pair; control means for changing the state of the pairs of ferroelectric elements from said first state to said second state; optical coupling means for optically coupling each output element to the control means for an adjacent pair of ferroelectric elements, and including means optically coupling the output element of the highest order pair of ferroelectric elements to the control means for the lowest order pair of ferroelectric elements; shifting means for applying a shifting pulse to the pairs of ferroelectric elements and the associated output elements, each output element providing an output signal in response to said pulse when its associated pair of ferroelectric elements is in said second state, the output signal acting through the optical coupling means to operate the control means of the next pair of ferroelectric elements to change said pair to said second state; reset means to reset the pair of ferroelectric elements formerly in said second state to said first state, the relative position in the counting device of the pair of elements in said second state being indicative of the number of shift pulses applied to the device; clearing means for causing all of the pairs of ferroelectric elements to assume said first state at the completion of a counting operation; and means to set the pair of ferroelectric elements corresponding to the lowest order position of the ring to said second state in preparation for a further counting operation.

16. A sequential counting device comprising, in combination, a plurality of pairs of ferroelectric elements, each pair being capable of assuming either of two stable states, the first state representing a first condition and the second state representing another condition; an output element associated with each pair; control means for changing the state of the pairs of ferroelectric elements from said first state to said second state; optical coupling means for optically coupling each output element to the control means for an adjacent pair of ferroelectric elements, and including means optically coupling the output element of the highest order pair of ferroelectric elements to the control means for the lowest order pair of ferroelectric elements; shifting means for applying a shifting pulse to the pairs of ferroelectric elements and the associated output elements, each output element providing an output signal in response to said pulse when its associated pair of ferroelectric elements is in said second state, the output signal acting through the optical coupling means to operate the control means for the next pair of ferroelectric elements to change said pair to said second state; and reset means to reset the pair of ferroelectric elements formerly in said second state to said first state, the relative position in the counting device of the pair of elements in said second state being indicative of the number of shift pulses applied to the device.

17. A sequentially operable device comprising, in combination, a plurality of pairs of ferroelectric elements; a separate pair of first and second parallel-connected electroluminescent output elements serially connected to each pair of ferroelectric elements; means for polarizing the ferroelectric elements of each pair in opposite directions, the direction of polarization of the elements of each pair with respect to each other representing information; separate control means associated with each pair of ferroelectric elements and capable of changing the direction of polarization of one of the ferroelectric elements of each pair, so that both ferroelectric elements of said pair are polarized in the same direction, each of said control means including a first and a second photoconductive element, the first photoconductive element of each control means being optically coupled to the first electroluminescent output element of a related pair of ferroelectric elements, and the second photoconductive element of each control means being optically coupled to the second electroluminescent output element of another related pair; selecting means for selectively rendering a similar one of the electroluminescent elements associated with each pair of ferroelectric elements capable of emitting radiant energy and for simultaneously rendering the other of said electroluminescent elements associated with each pair of ferroelectric elements incapable of emitting radiant energy, to thereby control the direction of shifting of the sequentially operable device; and first and second shifting means operatively coupled to first and second groups of alternate pairs of the ferroelectric elements, the two shifting means applying shift pulses in alternation to the two groups for causing an emission of radiant energy from the selected one of the electroluminescent elements associated with each pair of ferroelectric elements of the respective groups which are polarized in the same direction, to illuminate the photoconductive elements optically coupled to said electroluminescent elements and thereby operate the corresponding control means to change the direction of polarization of one of the ferroelectric elements associated with said corresponding control means and belonging to the group to which a shift pulse is not being applied at the time, and thus shift information from one pair of ferroelectric elements in one group to another pair of ferroelectric elements in the other group.

18. A sequentially operable device comprising, in combination, a plurality of pairs of ferroelectric elements; a separate pair of first and second parallel-connected electroluminescent output elements serially connected to each pair of ferroelectric elements; means for polarizing the ferroelectric elements of each pair in opposite directions, the direction of polarization of the elements of each pair with respect to each other representing information; separate control means associated with each pair of ferroelectric elements and capable of causing the ferroelectric elements of each pair to be polarized in the same direction, each of said control means including a first and a second photoconductive element, the first photoconductive element of each control means being optically coupled to the first electroluminescent output element of a related pair of ferroelectric elements, and the second photoconductive element of each control means being optically coupled to the second electroluminescent output element of another related pair; selecting means for selectively rendering a similar one of the electroluminescent elements associated with each pair of ferroelectric elements capable of emitting radiant energy and for simultaneously rendering the other of said electroluminescent elements associated with each pair of ferroelectric elements incapable of emitting radiant energy, to thereby control the direction of shifting of the sequentially operable device; and shifting means for causing an emission of radiant energy from the selected one of the electroluminescent elements associated with each pair of ferroelectric elements which are polarized in the same direction, to illuminate the photoconductive elements optically coupled to said electroluminescent elements and thereby operate the corresponding control means to cause the ferroelectric elements associated therewith to be polarized in the same direction.

References Cited in the file of this patent

UNITED STATES PATENTS

| | | |
|---|---|---|
| 2,691,738 | Matthias | Oct. 12, 1954 |
| 2,695,396 | Anderson | Nov. 23, 1954 |
| 2,743,430 | Schultz et al. | Apr. 24, 1956 |
| 2,816,236 | Rosen | Dec. 10, 1957 |
| 2,833,936 | Ress | May 6, 1958 |
| 2,836,766 | Halsted | May 27, 1958 |
| 2,839,738 | Wolfe | June 17, 1958 |
| 2,875,380 | Toulon | Feb. 24, 1959 |
| 2,900,522 | Reis | Aug. 18, 1959 |
| 2,904,626 | Rajchman et al. | Sept. 15, 1959 |
| 2,905,830 | Kazan | Sept. 22, 1959 |
| 2,907,001 | Loebner | Sept. 29, 1959 |

UNITED STATES PATENT OFFICE

CERTIFICATION OF CORRECTION

Patent No. 3,011,157 November 28, 196]

John R. Anderson

It is hereby certified that error appears in the above numbered patent requiring correction and that the said Letters Patent should read as corrected below.

Column 2, line 52, for "betwen" read -- between --; line 67, for "recangular" read -- rectangular --; column 6, lines 26 and 27, for "reptitious" read -- repetitious --; column 10, line 69, for "simliar" read -- similar --; column 18, line 27, for "of", second occurrence, read -- to --.

Signed and sealed this 10th day of April 1961.

(SEAL)
Attest:

ERNEST W. SWIDER
Attesting Officer

DAVID L. LADD
Commissioner of Patents